(12) United States Patent
Li et al.

(10) Patent No.: US 10,070,164 B2
(45) Date of Patent: Sep. 4, 2018

(54) PREDICTIVE ALLOCATION OF MULTIMEDIA SERVER RESOURCES

(75) Inventors: Zhi Li, Martinez, CA (US);
Raghvendra Savoor, Walnut Creek, CA (US); Aaron R. Sullivan, West Bend, WI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2503 days.

(21) Appl. No.: 11/972,369

(22) Filed: Jan. 10, 2008

(65) Prior Publication Data
US 2009/0183218 A1    Jul. 16, 2009

(51) Int. Cl.
*H04N 7/173*     (2011.01)
*H04N 21/254*    (2011.01)
*H04N 21/231*    (2011.01)
*H04N 21/24*     (2011.01)

(52) U.S. Cl.
CPC ..... *H04N 21/254* (2013.01); *H04N 21/23103* (2013.01); *H04N 21/2405* (2013.01)

(58) Field of Classification Search
CPC ........... H04N 21/2402; H04N 21/2404; H04N 21/2405; H04N 21/2407; H04N 21/2408
USPC ......................................................... 725/96
See application file for complete search history.

(56) References Cited

U.S. PATENT DOCUMENTS

| | | |
|---|---|---|
| 6,404,738 B1 | 6/2002 | Reininger et al. |
| 6,938,256 B2 | 8/2005 | Deng et al. |
| 6,999,477 B1 | 2/2006 | Oz et al. |
| 7,221,946 B2 | 5/2007 | Karaoguz et al. |
| 7,296,288 B1 | 11/2007 | Hill et al. |
| 7,302,493 B1 | 11/2007 | Alles et al. |
| 7,308,415 B2 | 12/2007 | Kimbrel et al. |
| 7,308,511 B2 | 12/2007 | Wilson et al. |
| 7,308,637 B2 | 12/2007 | Nakagawa et al. |
| 8,201,205 B2 * | 6/2012 | Boucher .............. H04L 12/2801 370/229 |
| 8,537,675 B2 * | 9/2013 | Ramakrishnan et al. .... 370/231 |
| 8,832,766 B2 * | 9/2014 | VerSteeg et al. ............. 725/118 |
| 2002/0152305 A1 * | 10/2002 | Jackson et al. ............... 709/224 |

(Continued)

OTHER PUBLICATIONS

U.S. Appl. No. 60/960,913 pp. 1-13.*
U.S. Appl. No. 60/884,773, filed Jan. 12, 2007.*

*Primary Examiner* — Fred Peng
(74) *Attorney, Agent, or Firm* — Guntin & Gust, PLC; Jay Anderson (57) ABSTRACT

Disclosed are techniques for dynamic allocation of multimedia server resources among multimedia transmission services of a service provider based on predicted resource usage by each multimedia transmission service. A predictive usage model of the utilization of server resources by one or more multimedia transmission services is generated for various combinations of operating characteristics, such as time of day, day of week, programming event or content, network status, and the like. The predictive usage model can be generated using past resource utilization characteristics of the multimedia transmission services from prior time periods having the same or similar characteristics. The service provider then can use the predictive usage model to more efficiently allocate multimedia server resources among the multimedia transmission services for upcoming time periods, which may be of fixed or variable duration.

20 Claims, 6 Drawing Sheets

(56) References Cited

U.S. PATENT DOCUMENTS

| | | | |
|---|---|---|---|
| 2005/0071882 A1* | 3/2005 | Rodriguez et al. | 725/95 |
| 2005/0228879 A1* | 10/2005 | Cherkasova et al. | 709/224 |
| 2006/0120282 A1* | 6/2006 | Carlson et al. | 370/229 |
| 2006/0293954 A1* | 12/2006 | Anderson et al. | 705/14 |
| 2007/0076728 A1 | 4/2007 | Rieger et al. | |
| 2007/0107012 A1 | 5/2007 | Rachamadugu | |
| 2007/0214483 A1* | 9/2007 | Bou-Abboud | 725/96 |
| 2007/0260921 A1* | 11/2007 | Cankaya et al. | 714/18 |
| 2008/0170622 A1* | 7/2008 | Gordon | H04N 21/23412 375/240.18 |
| 2008/0172671 A1* | 7/2008 | Bouillet et al. | 718/104 |
| 2008/0229379 A1* | 9/2008 | Akhter | H04N 7/17354 725/139 |
| 2008/0256409 A1* | 10/2008 | Oran | H04L 1/0009 714/748 |
| 2009/0031342 A1* | 1/2009 | VerSteeg | H04N 21/6581 725/38 |
| 2009/0172167 A1* | 7/2009 | Drai et al. | 709/226 |
| 2009/0241148 A1* | 9/2009 | Lo | 725/81 |
| 2009/0328119 A1* | 12/2009 | Kan | H04N 7/17318 725/107 |
| 2010/0157788 A1* | 6/2010 | Ellis | H04L 41/064 370/216 |
| 2013/0054804 A1* | 2/2013 | Jana et al. | 709/226 |
| 2014/0148122 A1* | 5/2014 | Meredith | H04W 28/0226 455/405 |

\* cited by examiner

PREDICTIVE ALLOCATION OF MULTIMEDIA SERVER RESOURCES

FIELD OF THE DISCLOSURE

The present disclosure generally relates to multimedia content distribution, and more particularly relates to the usage of multimedia servers in the provision of multimedia content via a network.

BACKGROUND

Internet Protocol Television (IPTV) systems and other packet network-based multimedia systems typically utilize one or more multimedia servers to process multimedia content for distribution to viewers via a packet-switched network. These multimedia servers typically provide multiple transmission services simultaneously, such as broadcasting network television programming and multicasting pay-per-view programming while simultaneously handling packet retransmission requests for lost and corrupted packets. Conventional systems often implement a best-effort approach to try to ensure that each service is accorded sufficient resources of the multimedia server, but it often is the case that changing circumstances can leave one or more of the services without sufficient resources to meet quality constraints while other services have more than sufficient resources, thereby degrading some services without necessarily benefiting the quality of other services at the multimedia server.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

FIGS. 1-8 illustrate example techniques for dynamic allocation of multimedia server resources among multimedia transmission services of a service provider based on predicted resource usage by each multimedia transmission service. In at least one embodiment, a predictive usage model of the utilization of server resources by one or more multimedia transmission services is generated for various combinations of operating characteristics, such as time of day, day of week, programming event or content, network status, and the like. The predictive usage model can be generated using past resource utilization characteristics of the multimedia transmission services from prior time periods having the same or similar characteristics. The service provider then can use the predictive usage model to more efficiently allocate multimedia server resources among the multimedia transmission services for upcoming time periods, which may be of fixed or variable duration.

The term "multimedia" refers to video content, audio content, or a combination thereof. Accordingly, the term "multimedia content" refers to a stream of video content, a stream of audio content, or a combination thereof. In the context of the output of audio content, either alone or in combination with the display of video content, a viewer is understood to be a listener. The term "multimedia transmission service" refers to a service or process performed by multimedia content service to affect the distribution of multimedia content to one or more viewer premises via a network (or via a plurality of networks). Example multimedia transmission services include, but are not limited to, linear program broadcasting (e.g., the broadcast transmission of network television program content or cable television program content), program multicasting (e.g., the multicast transmission of pay-per-view content), dropped/corrupted packet retransmission (e.g., packet retransmission to a single viewer via a unicast or packet retransmission to a group of viewers via a multicast), burst content unicasting (e.g., a burst transmission of multimedia content to a viewer in response to an instant channel change (ICC) request), multimedia encoding or transcoding, and the like. For readability purposes, multimedia transmission services are also referred to herein simply as "services."

The term "multimedia server resource" refers to a hardware or software resource of a multimedia server. Examples of multimedia server resources include operating system resources, thread resources, processor resources, bus resources, cache resources, memory resources, hard disk resources, network interface resources, bus resources, input/output (I/O) resources, and the like. For ease of reference, multimedia server resources are also referred to herein simply as "resources." The allocation of multimedia server resources to a particular multimedia transmission service can include, but is not limited to, the allocation of a quantity or proportion of a resource (e.g., a particular proportion of a processor's bandwidth for processing the multimedia transmission service or a particular proportion of a cache for caching data related to the multimedia transmission service), an allocation of a priority (e.g., assigning a particular priority to thread scheduling and processing for the multimedia transmission service), a selective enabling of a filtering mechanism (e.g., configuring a network interface to filter out incoming network packets associated with the multimedia transmission service), or combinations thereof.

For ease of illustration, certain techniques disclosed herein are described in an example context of an Internet Protocol Television (IPTV) network utilizing a multimedia receiver (e.g., a set top box (STB) device) at a viewer premises to interface between a display device, such as a television, monitor or display screen, and the multimedia content distribution network of a service provider. However, these techniques also can be implemented in other contexts without departing from the scope of the present disclosure. In the context of a relatively fixed multimedia receiver, a viewer premises can include, for example, a residence or place of work of the viewer, a car, a boat, a plane or other vehicle, and the like. In the context of a portable multimedia receiver, such as a multimedia-enabled cellular phone, a viewer premises can include the viewer's personal space while operating the multimedia receiver.

Figure 1:
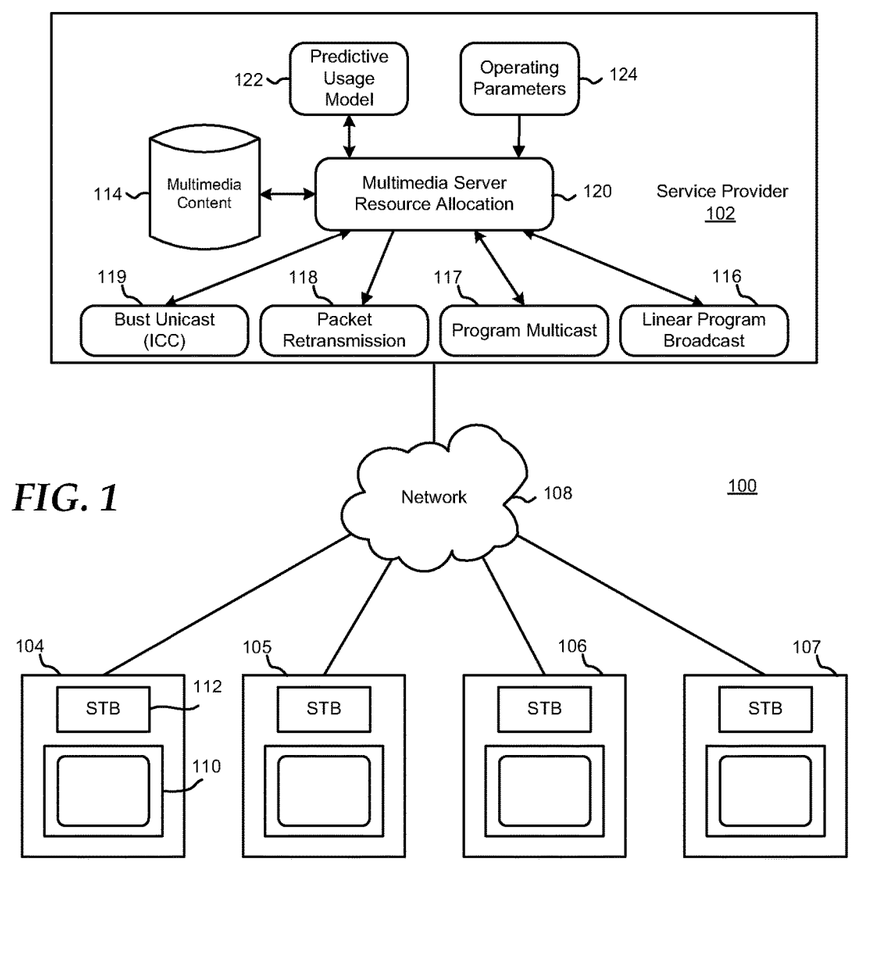
FIG. 1 is a diagram illustrating an example multimedia content distribution system having dynamic multimedia server resource allocation in accordance with at least one embodiment of the present disclosure.

FIG. 1 illustrates an example multimedia content distribution system 100 having dynamic allocation of multimedia server resources in accordance with at least one embodiment of the present disclosure. In the depicted example, the multimedia content distribution system 100 includes a service provider 102, a plurality of viewer premises (viewer premises 104-107), and a network 108, whereby the network 108 connects the service provider 102 and the viewer premises 104-107. The service provider 102 can include, for example, a cable television provider, a satellite television provider, an Internet-based multimedia content provider, and the like. Each of the viewer premises can include, for example, a display device 110 and a set top box (STB) device 112 or other multimedia receiver, such as a digital network radio receiver, a multimedia-enabled cellular phone, a digital radio receiver, and the like. The display device 110 can include, for example, a television, a monitor, or other display screen.

The network 108 can include any of a variety of digital networks or a combination thereof. Examples of the network 108 can include an Internet-Protocol (IP)-based network, such as the Internet, an Ethernet network, a wireless network (e.g., an IEEE 802.1a/b/g/n-compatible network), a satellite network, a Bluetooth™-based network, and the like. The transmission medium of the network 108 for wire-based implementations can include, for example, a coaxial cable-based medium (e.g., a cable television medium), a digital subscriber line (DSL)-based medium (e.g., a plain old telephone system (POTS) medium), a fiber-optic medium, and the like.

The service provider 102 includes one or more multimedia servers (not shown in FIG. 1) configured to provide one more multimedia transmission services supporting the distribution of multimedia content 114 to the viewer premises 104-107 via the network 108. These multimedia transmission services can include, but are not limited to, a linear program broadcast service 116, a program multicast service 117, a packet retransmission service 118, and a burst unicast service 119. The linear program broadcast service 116 represents a broadcast transmission of multimedia content to at least a substantial subset of the viewers associated with the service provider 102, such as an IP-based broadcast transmission of regular network television programming and regular cable television programming. The program multicast service 117 represents a multicast transmission of multimedia content to a more restricted subset of the viewers, such as an IP-based multicast of the multimedia content of a pay-per-view program event. The packet retransmission service 118 represents a retransmission of dropped or corrupted network packets for any of the other services, where the packet retransmission can be multicast when a significant proportion of the viewers are experiencing packet reception difficulties or, in some instances, unicast transmission to each viewer experiencing difficulties. Other examples of multimedia transmission services include multimedia encoding or transcoding (e.g., encoding video and audio information into compressed data in accordance with the H.264 format (also referred to as the MPEG4 format), the MPEG 2 format, the SMPTE 421M (VC-1) standard, and the like.

The service provider 102 and the network 108 each typically has a relatively fixed processing bandwidth and it often is the case that there are not enough multimedia server resources at the service provider 102 to ensure that each multimedia transmission service receives sufficient resources to achieve optimum performance of the multimedia transmission service. However, due to changing conditions, certain multimedia transmission services temporarily may have a higher precedence. To illustrate, due to the popularity of the National Football League (NFL™) Super Bowl as a televised event, viewers are unlikely to change channels frequently during the transmission of the football game itself, but there are likely to be many instant channel change requests during half-time as viewers browse other channels while waiting for the second half of the game to begin. Accordingly, since video quality is likely to be a more pressing issue than satisfactory performance for instant channel changes during the transmission of the football game, the linear program broadcast service 116 (which transmits the multimedia content of the game to the viewers) could be considered to have a higher priority than the burst unicast service 119 (which bursts video content to a viewer at the initiation of an instant channel change (ICC) request from the viewer) during the game itself. In contrast, the expected number of ICC requests during the halftime of the football game may make it appropriate to prioritize the burst unicast service 119 over the linear program broadcast service 116 to help ensure that the ICC requests from the viewers are satisfactorily handled.

To facilitate the more optimal processing of the multimedia transmission services, in one embodiment the service provider 102 includes a multimedia server resource allocation mechanism 120 to generate a predictive usage model 122 that provides a prediction of the resource needs of the multimedia transmission services for a given set of operating parameters (e.g., time of day, network status, special programming events, etc). The multimedia server resource allocation mechanism 120 further is configured to determine the operating parameters 124 for each successive time period (fixed or dynamic), and allocate multimedia server resources between the multimedia transmission services 116 based on the operating parameters 124 and the predictive usage model 122.

To illustrate, the predictive usage model 122 may be conceptually represented by a matrix indicating a particular allocation of resources between the multimedia transmission services 116-119 for each matrix entry. Each matrix entry can be indexed based on a particular combination of operating parameters (e.g., combinations of the time of day, the day of the week, the programming content, and the status of the network 108). The particular allocation for a given matrix entry can include, for example, a relative prioritization of the multimedia transmission services so as to determine the priority given by one or more multimedia servers in processing the multimedia transmission services. To illustrate, the particular allocation for a given time period could assign packets associated with the packet retransmission service 118 a higher priority for outgoing processing at a network interface of a multimedia server compared to packets associated with the linear program broadcast service 116. The particular allocation alternately can include a specific allocation of resources to each multimedia transmission service. To illustrate, the particular allocation could allocate a first number of processor cores of a multiple-processor multimedia server to the burst unicast service 119 and allocate a second number of the processor cores to the linear program broadcast service 116. The particular allocation of resources also can include the selective implementation of a filtering mechanism for one or more multimedia transmission services. To illustrate, a filtering mechanism can be enabled so that the network interface of a multimedia server disregards all incoming packet retransmission requests for the packet retransmission service 118 when it is appropriate to do so. The particular allocation also can include a combination of any of a priority assignment, a quantity/proportion allocation, or selective implementation of a filtering mechanism. Further, as discussed below with reference to FIGS. 2 and 3, the particular allocation can be on an intra-server allocation, an inter-server allocation, or a combination thereof.

By using the predictive usage model 122, in at least one embodiment the particular allocation implemented by the multimedia server resource allocation mechanism 120 can dynamically change as the operating parameters 124 change. The change in operating parameters 124 can result from the typical change in programming over the course of a day or a week, as a result in the change in the status of the network 108, and the like. The time period for which a particular resource allocation is implemented can be fixed, such as on a half-hour basis corresponding to the typical division of television programming into thirty-minute time slots. Alternately, the time period during which a particular allocation is implemented can be dynamic and can end in response to particular occurrences or non-occurrences of certain events. For example, one of the operating characteristics 124 can include a number of dropped packets such that once the number of dropped packets (or the proportion of dropped packets) exceeds a predetermined level, a new allocation is implemented that prioritizes the packet retransmission service 118.

Table 1 below illustrates a brief portion of a simple matrix representation of the predictive usage model 122. Table 2 illustrates the corresponding relative resource utilization characteristic for each service.

TABLE 1

Example Predictive Usage Model Matrix

| Time/Day | Monday | Tuesday | Wednesday | Thursday | Friday |
|---|---|---|---|---|---|
| 5:00 PM | USAGE_1 | USAGE_1 | USAGE_2 | USAGE_3 | USAGE_1 |
| 5:30 PM | USAGE_2 | USAGE_1 | USAGE_2 | USAGE_3 | USAGE_1 |
| 6:00 PM | USAGE_1 | USAGE_1 | USAGE_3 | USAGE_3 | USAGE_2 |
| 7:00 PM | USAGE_3 | USAGE_1 | USAGE_3 | USAGE_4 | USAGE_3 |

TABLE 2

Example Usage Types

| Usage | Burst Unicast | Packet Retransmission | Program Multicast | Linear Program Broadcast |
|---|---|---|---|---|
| USAGE_1 | Low | Low | Low | Medium |
| USAGE_2 | Low | High | Medium | High |
| USAGE_3 | High | Medium | Low | Medium |

In the example of Tables 1 and 2, the particular resource utilization characteristic of the multimedia transmission services for a given thirty minute time period on a given day of the week can be predicted from the matrix entry of the predictive usage model 122 indexed by the time period and day of the week. The identified resource utilization then can be used by the multimedia server resource allocation mechanism 120 to set relative priorities between the multimedia transmission services, to set particular hardware and software allocations, or to implement particular filter mechanisms as appropriate. To illustrate, the predicted usage for the time period at 7:00-7:30 PM on Monday is USAGE_3, which indicates that the burst unicast service 119 has a high resource utilization for this time period, whereas the program multicast service 117 and the linear program broadcast service 116 have a low resource utilization and a medium resource utilization, respectively, for this time period. Thus, the multimedia server resource allocation mechanism 120 may skew the allocation of multimedia server resources in favor of the burst unicast service 119 during this time period.

In addition to operating parameters associated with the multimedia content being transmitted, the status of the network 108 can be used as an operating parameter in predictive modeling of future resource needs. To illustrate, a network outage typically causes a significant increase in the number of lost packets and, consequently, a corresponding increase in the number of packet retransmission requests from the receiving devices. Depending on the scope of a network outage in the multimedia content distribution system 100, the service provider 102 could be flooded with millions of packet retransmission requests. The servicing of all of these packet retransmission requests could require extensive use of the multimedia server resources and therefore negatively impact the quality of other multimedia transmission services provided by the service provider 102. Accordingly, as illustrated by Table 3 below, when a network outage is not detected, the default resource allocation resulting from the predicted usage of Table 1 can be utilized. In contrast, when a network outage is detected (e.g., either as a total outage or when a proportion of dropped packets to overall packets exceeds a threshold), the default allocation is overridden by a different allocation whereby the packet retransmission service 118 is deprioritized and packet retransmission requests are filtered out so as to prevent the multimedia servers of the service provider 102 from being overwhelmed from processing of a flood of packet retransmissions.

TABLE 3

Resource Allocation Override Based On Network Status

| Network Status | Burst Unicast | Packet Retransmission | Program Multicast | Linear Program Broadcast |
|---|---|---|---|---|
| Normal | Default | Default | Default | Default |
| Outage | Default | Filter Out Incoming Packets Priority = Low | Default | Default |

Although the time period for a determine allocation of resources can be of a relatively fixed duration, in certain instances the allocation of resources may change dynamically based on a non-fixed event. To illustrate, Table 4 provides an example predictive usage model for the Super Bowl event described above.

TABLE 4

Resource allocations during Super Bowl Programming Event

| Event Portion | Burst Unicast | Packet Retransmission | Program Multicast | Linear Program Broadcast |
|---|---|---|---|---|
| Game Time | Priority = 3 | Priority = 1 | Priority = 2 | Priority = 0 |
| Halftime | Priority = 1 | Priority = 2 | Priority = 3 | Priority = 0 |
| Commercial Break | Priority = 1 | Priority = 3 | Priority = 2 | Priority = 0 |

As illustrated by Table 4, the assignment of relative priorities among the multimedia transmission services for scheduling of processing within the multimedia servers of the service provider 102 (with a priority of 0 being highest priority) can dynamically at the change between one portion of the programming event to another (e.g., from broadcast of the game to a commercial break or from broadcast of the game to halftime) rather than, or in addition to, at a particular time or after a particular fixed duration. Further, as Table 4 illustrates, the predictive usage model 122 can include resource allocation information for the particular operating parameters 124 in addition to, or in place of, the predicted resource allocation information for the particular operating parameters 124.

The predictive usage model 122 can be generated in any of a variety of manners. In one embodiment, predictive usage model 122 is generated from historical resource utilization characteristics as reported by the multimedia servers for time periods having one or more characteristics in common, such as occurring at the same time of day, during the same day of the week, during the same day of the month, having the same programming category (e.g., sports, movies, or a particular series), or being used to transmit the same programming event (e.g., the transmission of a particular movie on two successive weekend nights), and the like. In addition to, or instead of, historical modeling, a designer or programmer can generate the predictive usage model 122 based on expectations of resource utilization by multimedia transmission services for future events for which there is little or no historical information.

Figure 2:
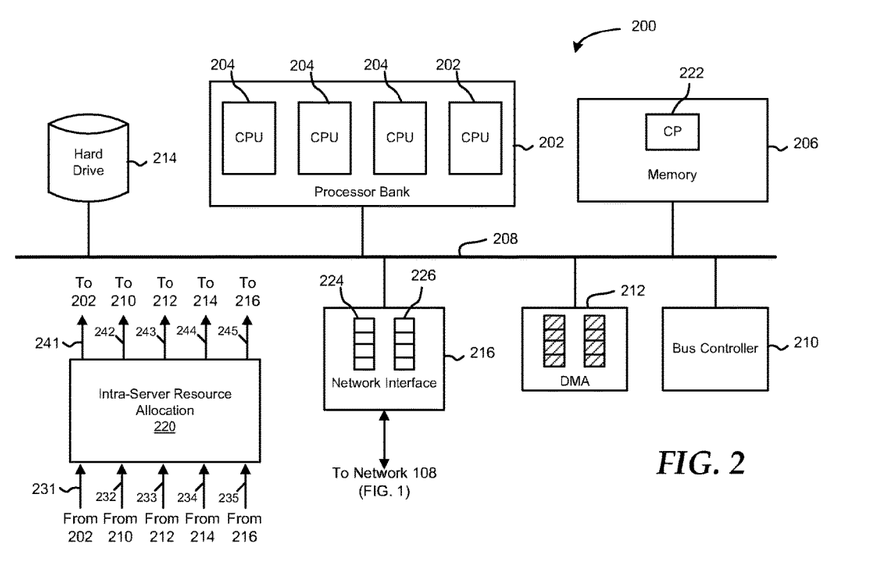
FIG. 2 is a diagram illustrating an example intra-server resource allocation mechanism in accordance with at least one embodiment of the present disclosure.

FIG. 2 illustrates an example implementation of a multimedia server 200 having dynamic intra-server resource allocation in accordance with at least one embodiment of the present disclosure. The multimedia server 200 corresponds to one or more multimedia servers implemented by the service provider 102 of FIG. 1 for the distribution of multimedia content to one or more viewer premises. In the illustrated example, the multimedia server 200 includes a processor bank 202 comprising one or more central processing units (CPUs) 204 or other processor cores, a memory 206 (e.g., random access memory), one or more busses 208 (e.g., a cross-point switch, a memory bus, etc.), a bus controller 210, a direct memory access (DMA) controller 212, a hard drive 214, a network interface 216, and an intra-server resource allocation module 220 (corresponding to the multimedia server resource allocation mechanism 120, FIG. 1). The intra-server resource allocation module 220 can be implemented as software, hardware, firmware, or a combination thereof. To illustrate, the intra-server resource allocation module 220 can be implemented as a computer program 222 stored in the memory 206 or the hard drive 214, whereby the computer program 222 comprises a set of instructions executed by one or more of the CPUs 204 so as to manipulate the one or more CPUs to perform the processes described herein.

The network interface 216 is coupled to the network 108 (FIG. 1) and performs network-level processing of incoming and outgoing data for the multimedia transmission services of the service provider 102, such as the packetization of outgoing data, the depacketization of incoming data, the filtering of data packets, and requests for lost/damaged packet retransmission. The processor bank 202 handles the processing of data for the multimedia transmission services, such as the encoding or transcoding of multimedia content, multicast and broadcast group management, digital rights management (DRM), and the processing of incoming ICC requests and the processing of the resulting outgoing burst of multimedia content. The DMA controller 212 manages direct memory accesses to the memory 206 for the data associated with the multimedia transmission services. The bus controller 210 manages access to the one or more buses 208 for transferring data between the components of the multimedia server 200.

The intra-server resource allocation module 220 includes inputs 231-235 to receive information from some or all of the resources of the multimedia server 200 regarding past utilization of the resources of the multimedia server 200 by the multimedia transmission services. To illustrate: the processor bank 202 can report processor utilization characteristics, cache utilization characteristics, and I/O utilization characteristics for each of the multimedia transmission services for particular past time periods; the memory 206 can provide memory utilization characteristics for past time periods, the bus controller 210 can provide bus utilization characteristics for past time periods, and so forth. The intra-server resource allocation module 220 can use these past resource utilization characteristics to generate the predictive usage model 122 as described in greater detail below with reference to FIG. 4.

The intra-server resource allocation module 220 further includes outputs 241-245 to the resources of the multimedia server 220 so as to configure the resources to process the multimedia transmission services in accordance with an allocation of resources determined from the predictive usage model 122 (FIG. 1). To illustrate, the intra-server resource allocation module 220 can configure the network interface 216 to flag packets associated with a particular multimedia transmission service as high priority, which may afford them a larger share of an incoming queue 224 or an outgoing queue 226 of the network interface 216. The intra-server resource allocation module 220 further can configure the network interface 216 to implement filtering of incoming and outgoing packets based on the multimedia transmission service with which they are associated (e.g., by filtering out packets associated with a very low priority multimedia transmission service). Likewise, the intra-server resource allocation module 220 can configure the DMA 212 and the bus controller 210 to process data from the multimedia transmission services based on their respective priorities. Further, the intra-server resource allocation module 220 can allocate the CPUs 204 and caches (not shown) of the processor bank 202 based on the determined allocation, as well as prioritize execution threads and interrupts associated with the multimedia transmission services based on their respective priorities, and the like. Thus, in effect, the intra-server resource allocation module 220 can distribute the "processing bandwidth" of the multimedia server 200 among the multimedia transmission services based on their relative priorities for a given time period as determined from the predictive usage model 122. Table 5 below is a non-limiting list of multimedia server resources which may be allocated by the intra-server resource allocation module 220.

TABLE 5

Example multimedia server resources

Figure 3:
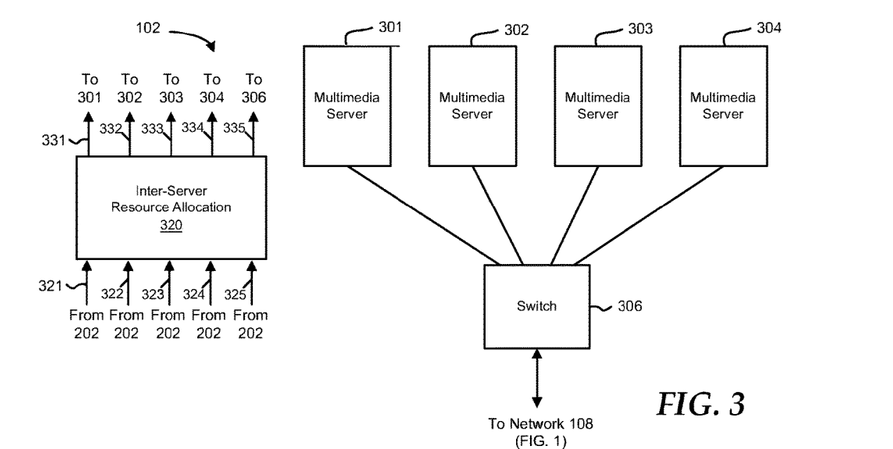
FIG. 3 is a diagram illustrating an example inter-server resource allocation mechanism in accordance with at least one embodiment of the present disclosure.

Process/Thread Prioritization
DMA Prioritization
Interrupt Prioritization
TCP/IP Incoming/Outgoing Queue Prioritization
I/O Prioritization
Memory Bus Prioritization
Cache Utilization
Cache Coherency Prioritization
Processor Core Utilization FIG. 3 illustrates an example implementation of the service provider 102 having dynamic inter-server resource allocation in accordance with at least one embodiment of the present disclosure. In the illustrated example, the service provider 102 includes a plurality of multimedia servers 301-304 coupled to one or more switches 306 or routers, which in turn are connected to the network 108 (FIG. 1). The service provider 102 further includes an inter-server resource allocation module 320 corresponding to the multimedia server resource allocation mechanism 120 of FIG. 1. As with the intra-server resource allocation module 220 of FIG. 2, the inter-server resource allocation module 320 can be implemented as firmware, hardware, software, or a combination thereof.

The multimedia servers 301-304 are configured to support the multimedia transmission services of the service provider 102 via the switch 306 and the network 108. The inter-server resource allocation module 320 includes inputs 321-325 to receive past resource utilization characteristics for the multimedia transmission services from the multimedia servers 301-304, from which the inter-server resource allocation module 320 can generate the prediction model 122 (FIG. 1) as described above. From the current operation characteristics 124 (FIG. 1) and the prediction usage model 122, the inter-server resource allocation module 320 can allocate the each of at least a subset of the multimedia servers 301-304 to a corresponding multimedia transmission service using outputs 331-335. To illustrate, inter-server resource allocation module 320 may allocate more of the multimedia servers 301-304 to a multimedia transmission service identified by the prediction usage model 122 as high priority or resource intensive for the corresponding time period and allocate fewer of the multimedia servers 301-304 to a multimedia transmission service identified as lower-priority or less resource intensive for the corresponding time period. The inter-server allocation of multimedia servers to multimedia transmission serves can occur in addition to, or instead of, the intra-server allocation described above with respect to FIG. 2.

Figure 4:
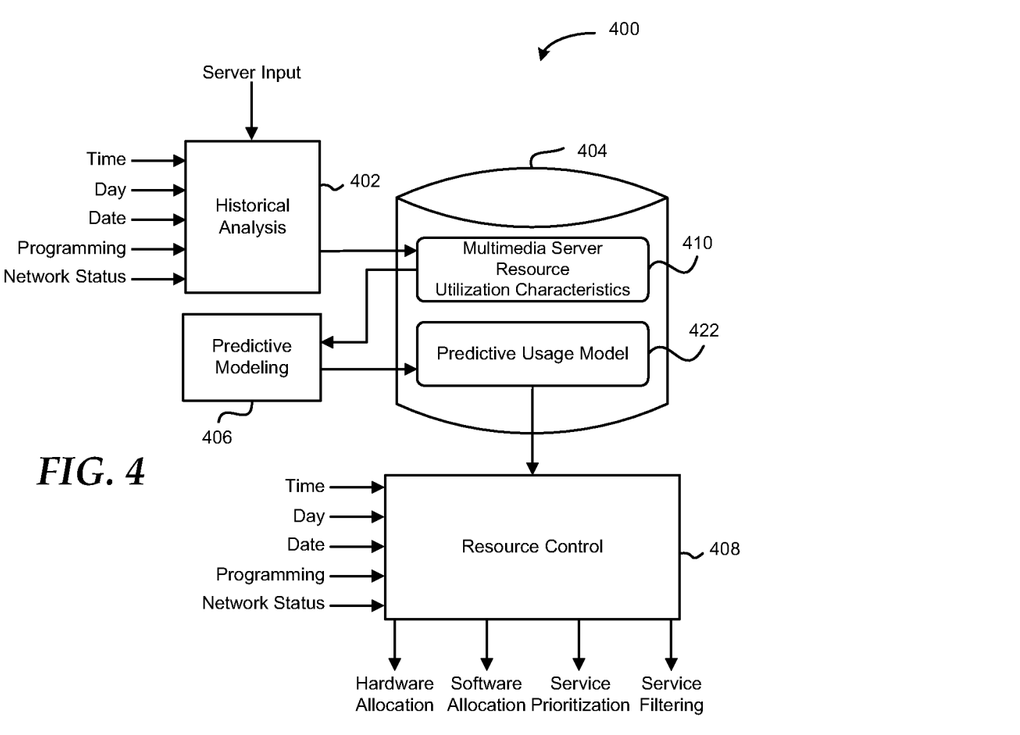
FIG. 4 is a diagram illustrating an example multimedia server resource allocation module in accordance with at least one embodiment of the present disclosure.

FIG. 4 illustrates an example resource allocation module 400 in accordance with at least one embodiment of the present disclosure. The resource allocation module 400 corresponds to the multimedia server resource allocation mechanism 120 of FIG. 1, the intra-server resource allocation module 220 of FIG. 2, or the inter-server resource allocation module 320 of FIG. 3.

In the illustrated example, the resource allocation module 400 includes a historical analysis module 402, a data store 404 (e.g., one or more data files, a database, etc. stored at a storage device), a predictive modeling module 406, and a resource control module 408. The modules 402, 406, and 408 can be implemented as software, firmware, hardware, or a combination thereof.

The historical analysis module 402 includes an input to receive server input representative of resource utilization characteristics by one or more of the multimedia transmission services of the service provider 102 for a particular time period. The historical analysis module 402 further includes inputs indicating operating characteristics associated with the particular time period for which the resource utilization characteristics are provided. These operating characteristics can include the time of day, the day of the week or the day of the month, the date, the programming available or subscribed to for the time period, and the network status (e.g., packet loss ratio, effective bandwidth, etc.) of the network 108 for the time period. The historical analysis module 402 filters, transforms, and otherwise processes this information to generate multimedia server resource utilization characteristic data 410 for the multimedia transmission services for the time period and for similar time periods that share one or more characteristics in common. The multimedia server resource utilization characteristic data 410 is stored in the data store 404.

The predictive modeling module 406 accesses the multimedia server resource utilization characteristic data 410 from the data store 404 and uses it to generate a predictive usage model 422 (corresponding to the predictive usage model 122, FIG. 1). To illustrate, the predictive modeling module 406 can use the resource utilization characteristics of the multimedia transmission services from past time periods occurring on the same day of the week and at the same time to predict the resource needs of the multimedia transmission resources for a future tie period occurring on the same day of the week and at the same time period. Other common characteristics of past time periods, such as a common programming event (e.g., the broadcast of the same episode of a show on two successive Tuesdays), a common programming category (e.g., sports, action, romance, etc.), a common special event (e.g., the annual Super Bowl event), a similar network status, and the like. Data representative of the predictive usage model 422 is stored at the data store 404 or another data store for subsequent access by the resource control module 408.

The resource control module 408 accesses the predictive usage model 422 to determine an allocation of multimedia server resources for a present or upcoming time period based on the predictive usage model 422 and one or more operating characteristics for the current or upcoming time period, such as the time of day, the day of the week or month, the date, the programming event or programming category, the network status, etc. To illustrate, the resource control module 408 can search or index the predictive usage model 422 to identify the resource utilization characteristics for past time periods sharing one or more operating characteristics in common with the current operating characteristics (e.g., the same time of day and day of the week or the same annual programming event). As these past resource utilization characteristics are predictive of the likely resource utilizations of the multimedia transmission services for a time period with similar characteristics, the past resource utilization characteristics as represented by the predictive usage model 422 can be used to allocate multimedia server resources between the multimedia transmission services. These resource allocations can include hardware allocation (e.g., cache allocation, memory allocation, processing bandwidth allocation), software allocation (e.g., thread allocation), prioritization allocation (e.g., thread prioritization, network interface prioritization), and filtering allocation (e.g., packet filtering at the network interface).

Figure 5:
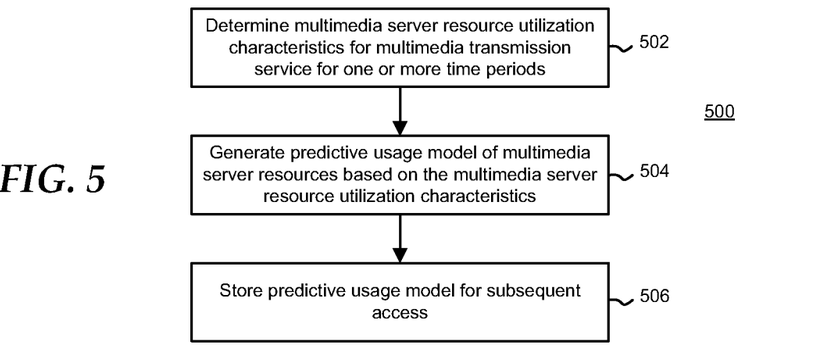
FIG. 5 is a flow diagram illustrating an example method for generating a predictive usage model for resource allocation in accordance with at least one embodiment of the present disclosure.

FIG. 5 illustrates an example method 500 for generating a predictive usage model for dynamic multimedia server resource allocation among a plurality of multimedia transmission services of a service provider in accordance with at least one embodiment of the present disclosure. At block 502, the service provider determines the multimedia server resource utilization characteristics of each multimedia transmission service for one or more past time periods. At block 504, the service provider generates a predictive usage model of the multimedia server resources by the multimedia transmission services based on the multimedia server resource utilization characteristics determined at block 502. At block 506, the service provider stores data representative of the predictive usage model at a data store (e.g., a file or a database) for subsequent access and use in determining a more optimum allocation of multimedia server resources for time periods having one or more characteristics in common with the one or more past time periods.

Figure 6:
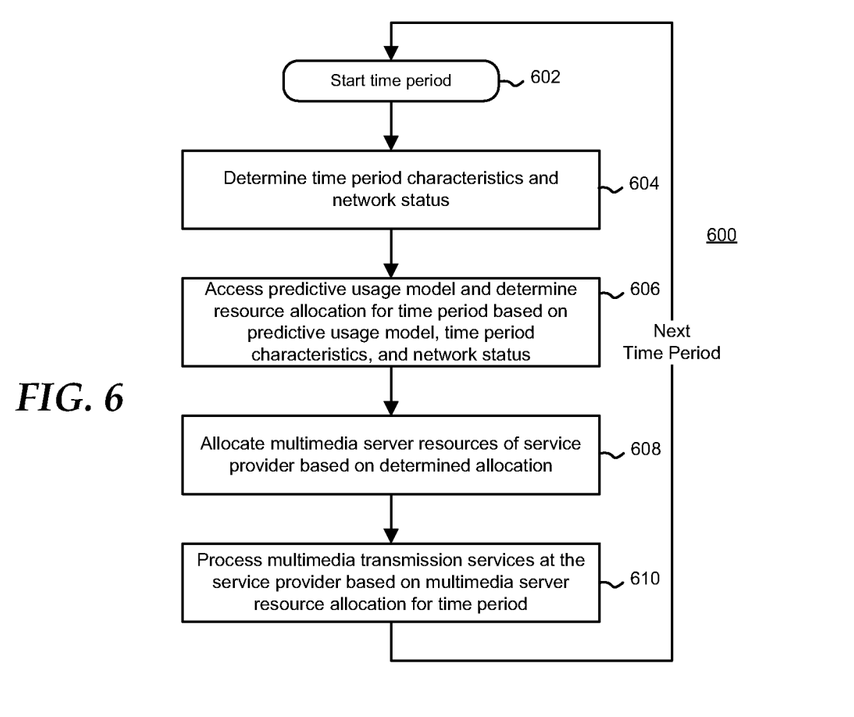
FIG. 6 is a flow diagram illustrating an example method for dynamic allocation of multimedia server resources based on a predictive usage model in accordance with at least one embodiment of the present disclosure.

FIG. 6 illustrates an example method 600 for determining an allocation of multimedia server resources for each of a series of time periods in accordance with at least one embodiment of the present disclosure. At block 602, a service provider prepares for multimedia transmission services to be provided during the upcoming time period. At block 604, the service provider determines one or more characteristics associated with the upcoming time period, such as the time of day, the date, the day of the week, the programming event occurring during the upcoming time period, and the like. Based on these identified characteristics, the service provider uses a predictive usage model to determine an allocation of multimedia server resources for the upcoming time period. In at least one embodiment, the predictive usage model provides the resource utilization characteristics of the multimedia transmission services for past time periods having the same or similar characteristics, and thus may be predictive of the resource needs of the multimedia transmission services for the upcoming time period. At block 606, the service provider allocates the resources of one or more multimedia servers between the multimedia transmission services based on the allocation determined at block 606. The allocation of resources can include the allocation of particular resources (e.g., a number of processors allocated to each multimedia transmission service) or a relative prioritization between the multimedia transmission services, from which the utilization of resources by a multimedia transmission service depends. At block 610, the service provider processes the multimedia transmission services for the time period based on the resource allocation at block 608. The process represented by blocks 602-610 can be repeated for the next upcoming time period.

Figure 7:
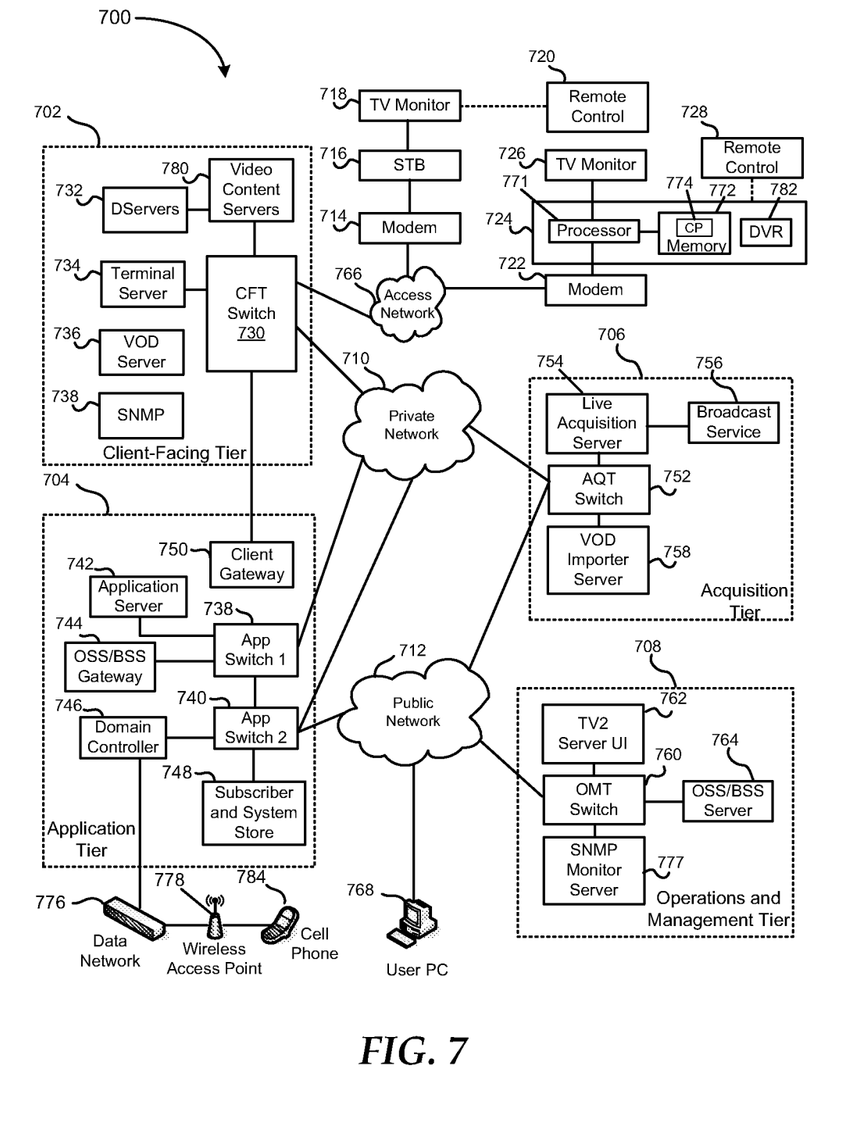
FIG. 7 is a diagram illustrating an example Internet Protocol Television (IPTV) network in which the multimedia content distribution system of FIG. 1 can be implemented in accordance with at least one embodiment of the present disclosure.

FIG. 7 illustrates an example Internet Protocol Television (IPTV) system 700 in which the disclosed video monitoring techniques can be implemented in accordance with at least one embodiment of the present disclosure. The IPTV system 700 can include a client facing tier 702, an application tier 704, an acquisition tier 706, and an operations and management tier 708. Each tier 702, 704, 706, and 708 is coupled to a private network 710, a public network 712, or both the private network 710 and the public network 712. For example, the client-facing tier 702 can be coupled to the private network 710. Further, the application tier 704 can be coupled to the private network 710 and to the public network 712, such as the Internet. The acquisition tier 706 can also be coupled to the private network 710 and to the public network 712. Moreover, the operations and management tier 708 can be coupled to the public network 712.

The various tiers 702, 704, 706, and 708 communicate with each other via the private network 710 and the public network 712. For instance, the client-facing tier 702 can communicate with the application tier 704 and the acquisition tier 706 via the private network 710. The application tier 704 can also communicate with the acquisition tier 706 via the private network 710. Further, the application tier 704 can communicate with the acquisition tier 706 and the operations and management tier 708 via the public network 712. Moreover, the acquisition tier 706 can communicate with the operations and management tier 708 via the public network 712. In a particular embodiment, elements of the application tier 704 can communicate directly with the client-facing tier 702.

The client-facing tier 702 can communicate with user equipment via a private access network 766, such as an Internet Protocol Television (IPTV) network. In an illustrative embodiment, modems, such as a first modem 714 and a second modem 722 can be coupled to the private access network 766. The client-facing tier 702 can communicate with a first representative STB device 716 via the first modem 714 and with a second representative STB device 724 via the second modem 722. The client-facing tier 702 can communicate with a large number of set-top boxes, such as the representative set-top boxes 716 and 724, over a wide geographic area, such as a regional area, a metropolitan area, a viewing area, or any other suitable geographic area that can be supported by networking the client-facing tier 702 to numerous set-top box devices. In an illustrative embodiment, the client facing tier or any portion thereof can be included at a video head-end office.

In one embodiment, the client-facing tier 702 can be coupled to the modems 714 and 722 via fiber optic cables. Alternatively, the modems 714 and 722 can be digital subscriber line (DSL) modems that are coupled to one or more network nodes via twisted pairs, and the client-facing tier 702 can be coupled to the network nodes via fiber-optic cables. Each set-top box device 716 and 724 can process data received through the private access network 766 via an IPTV software platform such as Microsoft® TV IPTV Edition.

Additionally, the first set-top box device 716 can be coupled to a first display device 718, such as a first television monitor, and the second set-top box device 724 can be coupled to a second display device 726, such as a second television monitor. Moreover, the first set-top box device 716 can communicate with a first remote control 720, and the second set-top box device can communicate with a second remote control 728. In an exemplary, non-limiting embodiment, each set-top box device 716 and 724 can receive data or video from the client-facing tier 702 via the private access network 766 and render or display the data or video at the display devices 718 and 726 to which it is coupled. In an illustrative embodiment, the set-top box devices 716 and 724 can include tuners that receive and decode television programming information for transmission to the display devices 718 and 726. The television tuner can be National Television System Committee (NTSC) tuner, an Advanced Television System Committee (ATSC), another suitable analog or digital tuner, or any combination thereof. A signal for a television channel can pass through the tuner before the content is displayed on a monitor.

In an exemplary, non-limiting embodiment, STB devices 716 and 724 can receive a data stream including video content data and audio content data from the client-facing tier 702 via the private access network 766. The STB device 716 and 724 can transmit the video content to an external display device, such as the television monitors 718 and 726. The STB devices 716 and 724 can also communicate commands received from the remote control devices 720 and 728 to the client-facing tier 702 via the private access network 766.

In an illustrative embodiment, the client-facing tier 702 can include a client-facing tier (CFT) switch 730 that manages communication between the client-facing tier 702 and the private access network 766 and between the client-facing tier 702 and the private network 710. As shown, the CFT switch 730 is coupled to one or more data servers 732 that store data transmitted in response to viewer requests, such as video-on-demand material. The CFT switch 730 can also be coupled to a terminal server 734 that provides terminal devices, such as a game application server and other devices with a common connection point to the private network 710. In a particular embodiment, the CFT switch 730 can also be coupled to a video-on-demand (VOD) server 736 that stores or provides VOD content imported by the IPTV system 700. The client-facing tier 702 can also include one or more channel provision servers 780 that transmit video content requested by viewers via their STB devices 716 and 724. In an illustrative, non-limiting embodiment, the channel provision servers 780 can include one or more of the multimedia servers of FIGS. 1-6.

As shown in FIG. 7, the application tier 704 can communicate with both the private network 710 and the public network 712. In this embodiment, the application tier 704 can include a first application tier (APP) switch 738 and a second APP switch 740. In a particular embodiment, the first APP switch 738 can be coupled to the second APP switch 740. The first APP switch 738 can be coupled to an application server 742 and to an OSS/BSS gateway 744. The application server 742 provides applications to the set-top box devices 716 and 724 via the private access network 766, so the set-top box devices 716 and 724 can provide functions, such as display, messaging, processing of IPTV data and VOD material, etc. In a particular embodiment, the OSS/BSS gateway 744 includes operation systems and support (OSS) data, as well as billing systems and support (BSS) data.

Further, the second APP switch 740 can be coupled to a domain controller 746 that provides web access, for example, to users via the public network 712. The second APP switch 740 can be coupled to a subscriber and system store 748 that includes account information, such as account information that is associated with users who access the system 700 via the private network 710 or the public network 712. In a particular embodiment, the application tier 704 can also include a client gateway 750 that communicates data directly to the client-facing tier 702. In this embodiment, the client gateway 750 can be coupled directly to the CFT switch 730. The client gateway 750 can provide user access to the private network 710 and the tiers coupled thereto.

In a particular embodiment, the set-top box devices 716 and 724 can access the system via the private access network 766, using information received from the client gateway 750. The private access network 766 provides security for the private network 710. User devices can access the client gateway 750 via the private access network 766, and the client gateway 750 can allow such devices to access the private network 710 once the devices are authenticated or verified. Similarly, the client gateway 750 can prevent unauthorized devices, such as hacker computers or stolen set-top box devices from accessing the private network 710, by denying access to these devices beyond the private access network 766.

For example, when a set-top box device 716 accesses the system 700 via the private access network 766, the client gateway 750 can verify subscriber information by communicating with the subscriber and system store 748 via the private network 710, the first APP switch 738 and the second APP switch 740. Further, the client gateway 750 can verify billing information and status by communicating with the OSS/BSS gateway 744 via the private network 710 and the first APP switch 738. The OSS/BSS gateway 744 can transmit a query across the first APP switch 738 to the second APP switch 740, and the second APP switch 740 can communicate the query across the public network 712 to an OSS/BSS server 764. After the client gateway 750 confirms subscriber and/or billing information, the client gateway 750 can allow the set-top box device 716 access to IPTV content and VOD content. If the client gateway 750 cannot verify subscriber information for the set-top box device 716, for example because it is connected to a different twisted pair, the client gateway 750 can deny transmissions to and from the set-top box device 716 beyond the private access network 766.

The acquisition tier 706 includes an acquisition tier (AQT) switch 752 that communicates with the private network 710. The AQT switch 752 can also communicate with the operations and management tier 708 via the public network 712. In a particular embodiment during operation of the IPTV system, the live acquisition server 754 can acquire television or movie content. The live acquisition server 754 can transmit the television or movie content to the AQT switch 752, and the AQT switch can transmit the television or movie content to the CFT switch 730 via the private network 710.

Further, the television or movie content can be transmitted to the channel provision servers 780, where it can be encoded, formatted, stored, or otherwise manipulated and prepared for communication to the STB devices 716 and 724. The CFT switch 730 can communicate the television or movie content to the modems 714 and 722 via the private access network 766. The STB devices 716 and 724 can receive the television or movie content via the modems 714 and 722, and can transmit the television or movie content to the television monitors 718 and 726. In an illustrative embodiment, video or audio portions of the television or movie content can be streamed to the STB devices 716 and 724.

Further, the AQT switch can be coupled to a VOD importer server 758 that stores television or movie content received at the acquisition tier 706 and communicates the stored content to the VOD server 736 at the client-facing tier 702 via the private network 710. Additionally, at the acquisition tier 706, the VOD importer server 758 can receive content from one or more VOD sources outside the IPTV system 700, such as movie studios and programmers of non-live content. The VOD importer server 758 can transmit the VOD content to the AQT switch 752, and the AQT switch 752, in turn, can communicate the material to the CFT switch 730 via the private network 710. The VOD content can be stored at one or more servers, such as the VOD server 736.

When users issue requests for VOD content via the STB devices 716 and 724, the requests can be transmitted over the private access network 766 to the VOD server 736 via the CFT switch 730. Upon receiving such requests, the VOD server 736 can retrieve the requested VOD content and transmit the content to the STB devices 716 and 724 across the private access network 766 via the CFT switch 730. The STB devices 716 and 724 can transmit the VOD content to the television monitors 718 and 726. In an illustrative embodiment, video or audio portions of VOD content can be streamed to the STB devices 716 and 724.

The operations and management tier 708 can include an operations and management tier (OMT) switch 760 that conducts communication between the operations and management tier 708 and the public network 712. In the embodiment illustrated by FIG. 7, the OMT switch 760 is coupled to a TV2 server 762. Additionally, the OMT switch 760 can be coupled to the OSS/BSS server 764 and to a simple network management protocol (SNMP) monitor 777 that monitors network devices within or coupled to the IPTV system 700. In a particular embodiment, the OMT switch 760 can communicate with the AQT switch 752 via the public network 712.

In a particular embodiment during operation of the IPTV system, the live acquisition server 754 can acquire television content from the broadcast service 756. The live acquisition server 754 can transmit the television or movie content to the AQT switch 752, and the AQT switch 752 in turn can transmit the television content to the CFT switch 730 via the private network 710 or to the OMT switch 760 via the public network 712. Further, the television content can be encoded at the D-servers 732, and the CFT switch 730 can communicate the television content to the modems 714 and, 722 via the private access network 766. The set-top box devices 716 and 724 can receive the television content from the modems 714 and 722, decode the television content, and transmit the content to the display devices 718 and 726 according to commands from the remote control devices 720 and 728.

Additionally, at the acquisition tier 706, the video-on-demand (VOD) importer server 758 can receive content from one or more VOD sources outside the IPTV system 700, such as movie studios and programmers of non-live content. The VOD importer server 758 can transmit the VOD content to the AQT switch 752, and the AQT switch 752 in turn can communicate the material to the CFT switch 730 via the private network 710. The VOD content can be stored at one or more servers, such as the VOD server 736.

When a user issues a request for VOD content to set-top box devices 716 and 724, the request can be transmitted over the private access network 766 to the VOD server 736 via the CFT switch 730. Upon receiving such a request, the VOD server 736 can retrieve requested VOD content and transmit the content to the set-top box devices 716 and 724 across the private access network 766 via the CFT switch 730. In an illustrative embodiment, the live acquisition server 754 can transmit the television content to the AQT switch 752, and the AQT switch 752 in turn can transmit the television content to the OMT switch 760 via the public network 712. In this embodiment, the OMT switch 760 can transmit the television content to the TV2 server 762 for display to users accessing the user interface at the TV2 server. For example, a user can access the TV2 server 762 using a personal computer 768 coupled to the public network 712.

The domain controller 746 communicates with the public network 712 via the second APP switch 740. Additionally, the domain controller 746 can communicate via the public network 712 with the personal computer 768. For example, the domain controller 746 can display a web portal via the public network 712 and allow users to access the web portal using the PC 768. Further, in an illustrative embodiment, domain controller 746 can communicate with at least one wireless network access point 778 over a data network 776. In this embodiment, each wireless network access device 778 can communicate with user wireless devices, such as a cellular telephone 784.

In a particular embodiment, a set-top box device such as the second set-top box device 724 can include an STB processor 771 and an STB memory device 772 that is accessible to the STB processor 771. The set-top box device 724 also includes a STB computer program 774 that is embedded within the STB memory device 772. In a particular embodiment, the STB computer program 774 can contain instructions to receive and execute at least one user television viewing preference that a user has entered by accessing an Internet user account via the domain controller 746. For example, the user can use the PC 768 to access a web portal maintained by the domain controller 746 via the Internet. The domain controller 746 can query the subscriber and system store 748 via the private network 710 for account information associated with the user. In a particular embodiment, the account information can associate the user's Internet account with the second set-top box device 724. For instance, in an illustrative embodiment, the account information can relate the user's account to the second set-top box device 724, by associating the user account with an IP address of the second set-top box device with data relating to one or more twisted pairs connected with the second set-top box device 724, with data related to one or more fiber optic cables connected with the second set-top box device 724, with an alphanumeric identifier of the second set-top box device 724, with any other data that is suitable for associating second set-top box device 724 with a user account, or with any combination of these.

The STB computer program 774 can contain instructions to receive many types of user preferences from the domain controller 746 via the access network 766. For example, the STB computer program 774 can include instructions to receive a request to record at least one television program at a video content storage module such as a digital video recorder (DVR) 782 within the second set-top box device 724. In this example embodiment, the STB computer program 774 can include instructions to transmit the request to the DVR 782, where the television program(s) are recorded.

In an illustrative embodiment, the STB computer program 774 can include instructions to receive from the DVR 782 a recording status with respect to one or more of the television programs and to transmit at least one message regarding the status to a wireless device, such as the cellular telephone 784. The message can be received at the CFT switch 730, for instance, and communicated to the domain controller 746 across the private network 710 via the second APP switch 740. Further, the domain controller 746 can transmit the message to the wireless data network 776, directly or via the public network 712, and on to the wireless network access point 778. The message can then be transmitted to the cellular telephone 784. In an illustrative embodiment, the status can be sent via a wireless access protocol (WAP). Further details of the IPTV system are taught in U.S. Patent Application Publication No. 2007/0199041, the disclosure of which is hereby incorporated by reference.

Figure 8:
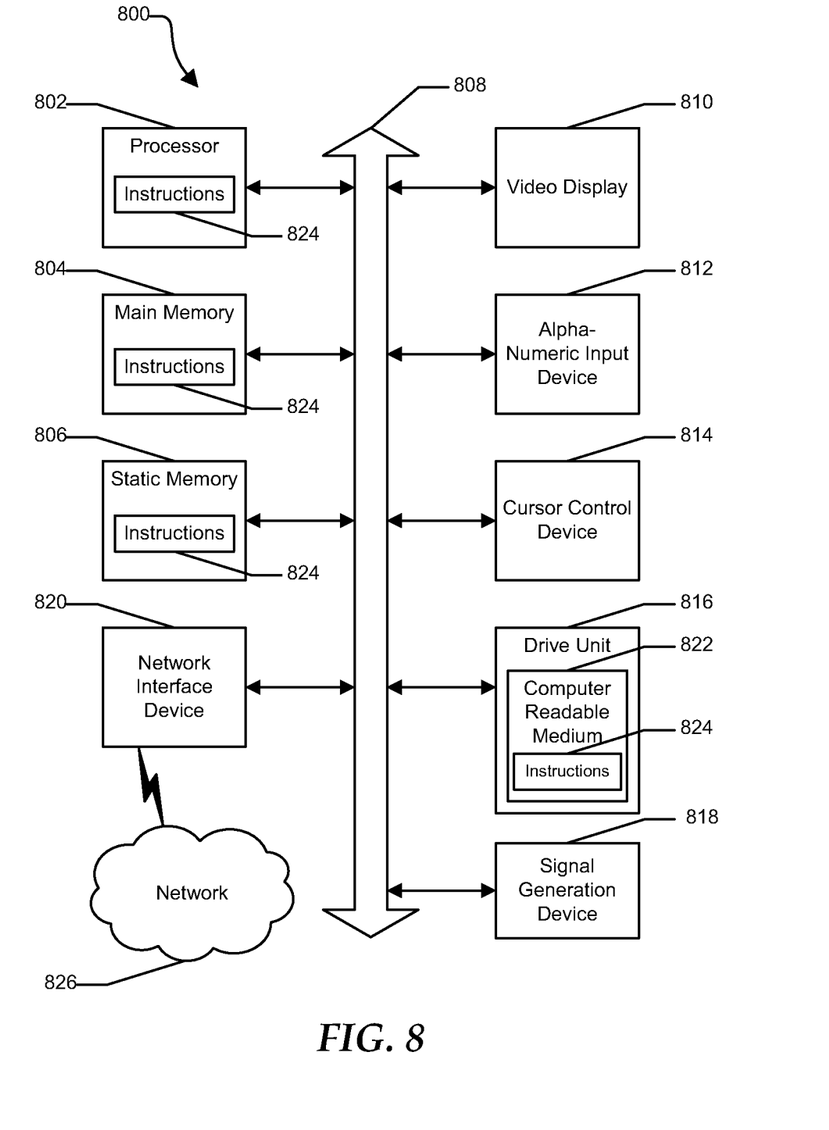
FIG. 8 is a diagram illustrating an example computer system for implementing one or more of the techniques described herein in accordance with at least one embodiment of the present disclosure.

FIG. 8 shows an illustrative embodiment of a general computer system 800 in accordance with at least one embodiment of the present disclosure. The computer system 800 can include a set of instructions that can be executed to cause the computer system 800 to perform any one or more of the methods or computer based functions disclosed herein. The computer system 800 may operate as a stand-alone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into, for example, a STB device. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art.

Such standards are periodically superseded by faster or more efficient equivalents having essentially the same functions. Accordingly, replacement standards and protocols having the same or similar functions as those disclosed herein are considered equivalents thereof.

What is claimed is:

1. A method comprising:

monitoring, by a processing system including a processor of service provider equipment in a multimedia content distribution network, historical resource utilization characteristics of each of a plurality of servers communicatively coupled to the network, wherein the monitoring further comprises monitoring utilization of thread resources of each server of the plurality of servers;

generating, by the processing system, a predictive usage model of the thread resources associated with a plurality of multimedia transmission services according to the historical resource utilization characteristics;

storing, by the processing system, the predictive usage model;

applying, by the processing system, the predictive usage model to each server of the plurality of servers, to determine for that server a relative priority of a plurality of execution threads for providing a plurality of multimedia transmission services during a programming event;

generating, by the processing system, according to the predictive usage model one of a plurality of priorities for processing a retransmission of packets associated with the programming event, and transitions between a first portion of the programming event having a first programming type and a second portion of the programming event having a second programming type; and assigning, by the processing system, a first priority of the plurality of priorities to the plurality of execution threads utilized by at least one of the plurality of servers responsive to detecting a packet retransmission of content associated with the programming event, wherein the assigning is in accordance with exceeding a threshold of dropped packets, and wherein the assigning enables a filter for processing the packet retransmission in accordance with the first priority, wherein the first priority causes incoming packet retransmission requests associated with unicast requests to be given lower priority than packet retransmission requests associated with multicast requests, assigning, by the processing system, a second priority of the plurality of priorities to the plurality of execution threads of the at least one of the plurality of servers responsive to detecting a first transition from the second programming type to the first programming type of the programming event, wherein the assigning the second priority enables a multicast transmission associated with the first programming type to have a higher priority than a content request requiring a unicast transmission; and assigning, by the processing system, a third priority of the plurality of priorities to the plurality of execution threads of the at least one of the plurality of servers responsive to detecting a second transition from the first programming type to the second programming type of the programming event, wherein the assigning the third priority increases a priority for processing the content request requiring the unicast transmission.

2. The method of claim 1, wherein the threshold is a first threshold of dropped packets lower than a second threshold of dropped packets corresponding to a network outage status.

3. The method of claim 1, further comprising allocating, by the processing system, at least a portion of each resource of a plurality of available resources of a multimedia server of the service provider equipment to a corresponding multimedia transmission service.

4. The method of claim 1, wherein the plurality of multimedia transmission services comprises: a linear program broadcast service; a packet retransmission multicast service; a program multicast service; or a content burst unicast service.

5. The method of claim 4, wherein the content burst unicast service comprises an instant channel change service.

6. The method of claim 3, wherein the allocating is performed according to the predictive usage model based on: a time of day of the programming event; a day of the week of the programming event; a day of the month of the programming event; a date of the programming event; or a status of the network.

7. The method of claim 1, wherein the programming event occurs during a first time period, and further comprising:

determining, by the processing system, thread resource utilization characteristics associated with each of the plurality of multimedia transmission services for at least a second time period preceding the first time period; and generating, by the processing system, the predictive usage model based on the thread resource utilization characteristics.

8. The method of claim 7, wherein the first time period and the second time period share in common a same day of the week; a same day of the month; a same date; or a same status of the network.

9. The method of claim 7, further comprising:

allocating, by the processing system, the thread resources for each server for the second time period based on application of the predictive usage model to that server.

10. The method of claim 1, wherein each server includes resources comprising operating system resources, processor resources, bus resources, cache resources, memory resources, hard disk resources, network interface resources, or input/output resources.

11. A method comprising:

determining, by a processing system including a processor, at each server of a plurality of servers communicatively coupled to service provider equipment in a multimedia content distribution network, thread resource utilization characteristics of that server;

generating, by the processing system, a predictive usage model of thread resources of each server based on the thread resource utilization characteristics of that server and based on an operation time, a network status and specialized programming events;

storing, by the processing system, the predictive usage model at a data store for subsequent access;

applying, by the processing system, the predictive usage model to determine for each server a relative priority of a plurality of execution threads for providing a plurality of multimedia transmission services during a programming event, the programming event comprising a first portion having a first programming type and a second portion having a second programming type; and assigning, by the processing system, a first priority to the plurality of execution threads utilized by at least one of the plurality of servers responsive to detecting a packet retransmission of content associated with the programming event, wherein the assigning is in accordance with exceeding a threshold of dropped packets, and wherein the assigning enables a filter for processing the packet retransmission in accordance with the first priority, wherein the first priority causes incoming packet retransmission requests associated with unicast requests to be given lower priority than packet retransmission requests associated with multicast requests;

assigning, by the processing system, a second priority to the plurality of execution threads of the at least one of the plurality of servers responsive to detecting a first transition from the second programming type to the first programming type, wherein the assigning the second priority enables a multicast transmission associated with the first programming type to have a higher priority than a content request requiring a unicast transmission; and assigning, by the processing system, a third priority of the plurality of priorities to the plurality of execution threads of the at least one of the plurality of servers responsive to detecting a second transition from the first programming type to the second programming type, wherein the assigning the third priority increases a priority for processing the content request requiring the unicast transmission.

12. The method of claim 11, wherein each server includes multimedia server resources comprising the thread resources, and further comprising monitoring, by the processing system, utilization of the multimedia server resources of each server at that server.

13. The method of claim 11, wherein the packet retransmission is performed by a packet retransmission service comprising a packet retransmission multicast service, and wherein the plurality of multimedia transmission services further comprises: a linear program broadcast service; a program multicast service; or a content burst unicast service.

14. A device comprising:
a processing system including a processor; and
a memory that stores executable instructions that, when executed by the processing system, facilitate performance of operations, comprising:
storing in a data store a predictive usage model of thread resources used by a plurality of servers communicatively coupled to a network, wherein the predictive usage model is based on thread resource utilization characteristics of each server of the plurality of servers and based on an operation time, a network status and programming events;
applying the predictive usage model to each server of the plurality of servers, to determine for that server a relative priority of a plurality of execution threads for providing multimedia transmission services during a programming event, the programming event comprising a first portion having a first programming type and a second portion having a second programming type;
assigning a first priority, a second priority and a third priority to the plurality of execution threads by an assignment circuit that performs operations comprising:
assigning the first priority to the plurality of execution threads utilized by at least one of the plurality of servers responsive to detecting a packet retransmission of content associated with the programming event, wherein the assigning is in accordance with exceeding a threshold of dropped packets, and wherein the assigning enables a filter for processing the packet retransmission in accordance with the first priority, wherein the first priority causes incoming packet retransmission requests associated with unicast requests to be given lower priority than packet retransmission requests associated with multicast requests;

assigning the second priority to the plurality of execution threads of the at least one of the plurality of servers responsive to detecting a first transition from the second programming type to the first programming type, wherein the assigning the second priority enables a multicast transmission associated with the first programming type to have a higher priority than a content request requiring a unicast transmission; and assigning the third priority to the plurality of execution threads of the at least one of the plurality of servers responsive to detecting a second transition from the first programming type to the second programming type, wherein the assigning the third priority increases a priority for processing the content request requiring the unicast transmission.

15. The device of claim 14, wherein the assigning of the first priority, the second priority and the third priority comprises prioritization of the of multimedia transmission services for a time period corresponding to the programming event.

16. The device of claim 15, wherein each server includes multimedia server resources comprising the thread resources, and wherein the thread resource utilization characteristics are based on monitoring utilization of the resources of each of the plurality of servers.

17. The device of claim 14, wherein the multimedia transmission services comprise: a linear program broadcast service; a packet retransmission multicast service; a program multicast service; or a content burst unicast service.

18. A non-transitory machine-readable storage medium, comprising executable instructions that, when executed by a processing system including a processor, facilitate performance of operations comprising:
determining thread resource utilization characteristics of each of a plurality of servers communicatively coupled to a network;
generating a predictive usage model of the thread resources of each server of the plurality of servers, based on historical resource utilization characteristics of that server;
storing the predictive usage model at a data store for subsequent access;
applying the predictive usage model to each server of the plurality of servers, to determine for that server a relative priority of a plurality of execution threads for providing a plurality of multimedia transmission services during a programming event, the programming event comprising a first portion having a first programming type and a second portion having a second programming type; and
assigning a first priority to the plurality of execution threads utilized by at least one of the plurality of servers responsive to detecting a packet retransmission of content associated with the programming event, wherein the assigning is in accordance with exceeding a threshold of dropped packets, and wherein the assigning enables a filter for processing the packet retransmission in accordance with the first priority, wherein the first priority causes incoming packet retransmission requests associated with unicast requests to be given lower priority than packet retransmission requests associated with multicast requests;

assigning a second priority to the plurality of execution threads of the at least one of the plurality of servers responsive to detecting a first transition from the second programming type to the first programming type, wherein the assigning the second priority enables a multicast transmission associated with the first programming type to have a higher priority than a content request requiring a unicast transmission; and assigning a third priority of the plurality of priorities to the plurality of execution threads of the at least one of the plurality of servers responsive to detecting a second transition from the first programming type to the second programming type, wherein the assigning the third priority increases a priority for processing the content request requiring the unicast transmission.

19. The non-transitory machine-readable storage medium of claim 18, wherein each server of the plurality of servers includes multimedia server resources comprising network interface resources; bus resources; input/output resources; memory resources; cache resources; or processor resources.

20. The non-transitory machine-readable storage medium of claim 18, wherein the packet retransmission is performed by a packet retransmission service comprising a packet retransmission multicast service, and wherein the plurality of multimedia transmission services further comprises: a linear program broadcast service; a program multicast service; or a content burst unicast service.

* * * * *